United States Patent
Nakatani et al.

(10) Patent No.: US 7,062,156 B2
(45) Date of Patent: Jun. 13, 2006

(54) DIGITAL VIDEO RECORDING APPARATUS

(75) Inventors: Tokuo Nakatani, Katano (JP); Kazuhiko Nakamura, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1139 days.

(21) Appl. No.: 09/891,176

(22) Filed: Jun. 26, 2001

(65) Prior Publication Data
US 2001/0055467 A1 Dec. 27, 2001

(30) Foreign Application Priority Data
Jun. 26, 2000 (JP) ............................ 2000-190890
Jun. 26, 2000 (JP) ............................ 2000-190891

(51) Int. Cl.
*H04N 7/64* (2006.01)
*H04N 5/91* (2006.01)

(52) U.S. Cl. .................... 386/113; 386/95; 386/125

(58) Field of Classification Search ................ 386/21, 386/45, 95, 113, 125–126
See application file for complete search history.

(56) References Cited

U.S. PATENT DOCUMENTS

| | | | |
|---|---|---|---|
| 6,078,727 A | 6/2000 | Saeki et al. | |
| 6,212,330 B1 | 4/2001 | Yamamoto et al. | |
| 6,577,811 B1* | 6/2003 | Kikuchi et al. | 386/98 |
| 2002/0018644 A1* | 2/2002 | Isobe et al. | 386/125 |

FOREIGN PATENT DOCUMENTS

| | | |
|---|---|---|
| EP | 860 829 | 8/1998 |
| EP | 0 903 743 | 3/1999 |
| EP | 965 991 | 12/1999 |
| EP | 1 085 513 | 3/2001 |
| JP | 7-29357 | 1/1995 |
| JP | 9-259542 | 10/1997 |
| JP | 10-234002 | 9/1998 |
| JP | 11-96730 | 4/1999 |
| JP | 11-155130 | 6/1999 |
| JP | 11-259957 | 9/1999 |
| JP | 2000-4421 | 1/2000 |
| JP | 2000-69414 | 3/2000 |
| JP | 2000-78519 | 3/2000 |
| JP | 2001-266496 | 9/2001 |

* cited by examiner

*Primary Examiner*—Thai Tran
*Assistant Examiner*—Mishawn Dunn
(74) *Attorney, Agent, or Firm*—Wenderoth, Lind & Ponack, L.L.P.

(57) ABSTRACT

A recording apparatus that records video data and corresponding playback control information onto a recording medium includes a recovery processing unit detects whether an abnormality occurred and stopped recording of video data, and if it detects the abnormality, it generates playback control information corresponding to the video data having been recorded on the recording medium up to the point when the abnormality occurred, where the playback control information controls playback operation of a playback apparatus, and the abnormality indicates that a recording of video data abnormally stopped and corresponding playback control information was not recorded onto the recording medium.

12 Claims, 13 Drawing Sheets

DIGITAL VIDEO RECORDING APPARATUS

BACKGROUND OF THE INVENTION (1) Field of the Invention

The present invention relates to a digital video recording apparatus that upon occurrence of a writing error or a power failure, makes video data stored in a recording medium coordinate with management information managing the video data, during the recovery operation.

(2) Description of Related Art

Conventional VCRs record video data continuously on tape. In this recording method, the recording order of video data on tape is used as the playback order as it is, and any special information is not required for management of the playback order of the recorded video data.

VCRs in recent years, however, record management information such as marks like VISS together with video data so that the starts of recorded sequences can be located.

With the above construction, if a writing error or a power failure occurs during recording of video data, both the video data and the management information are recorded onto the video tape up to the point of the occurrence of such a failure. That is to say, such VCRs do not require any special recovery process if a writing error or a power failure occurs during recording of video data.

In contrast, DVD (Digital Versatile Disk) recorders or HDD (Hard Disk Drive) recorders (hereinafter generically referred to as digital video recording apparatuses) record sequences of video data in discontinuous areas on recording mediums. This method requires, therefore, management information used for managing addresses of the recorded sequences of video data on recording mediums.

For the above reason, the digital video recording apparatuses update the management information each time they record a certain amount of video data onto a recording medium.

However, if a writing error or a power failure occurs during recording of video data, a mismatch occurs between a file storing the recorded video data (hereinafter referred to as stream file) and the management information. Also, in such a case, a stream file may be successfully recorded onto a recording medium, but the video data in the stream file may not be managed by the management information. In this case, the video data is not played back.

One method of solving the above problem is to write the management information onto the recording medium with the same timing as the video data so that the stream files always coordinate with the management information. This method, however, has another problem that data should be frequently written onto the recording medium.

SUMMARY OF THE INVENTION

It is therefore an object of the present invention to provide a digital video recording apparatus that eliminates a mismatch that occurs between a stream file and the management information when a writing error or a power failure occurs during recording of video data, without allowing the stream files to always coordinate with the management information, and recovers the video data, which is stored in a stream file but cannot be played back by conventional methods, as much as possible so as to play back the recovered video data.

The above object is fulfilled by a recording apparatus comprising: a recording unit operable to record video data and playback control information corresponding to the video data onto a recording medium, the playback control information controlling playback operation of a playback apparatus; a detecting unit operable to detect an abnormality which indicates that the recording unit abnormally stopped recording of a piece of video data and failed to record a corresponding piece of playback control information onto the recording medium; a generating unit operable to, when the detecting unit detects the abnormality, generate a piece of playback control information corresponding to the piece of video data which was abnormally stopped being recorded; and a controlling unit operable to control the recording unit to record the generated piece of playback control information onto the recording medium.

In the above recording apparatus, each piece of playback control information may contain section information indicating a playback section of a corresponding piece of video data to the playback apparatus.

With the above construction, even if a recording abnormally stops, a piece of playback control information is generated in correspondence with a piece of video data which was abnormally stopped being recorded. This eliminates a mismatch between the video data recorded on the recording medium and the playback control information. Also, since the generated playback control information specifies a playback section, a sequence of video data that could not be played back by conventional methods can be played back as much as possible.

In the above recording apparatus, the detecting unit may detect that the recording unit abnormally stopped recording of a piece of video data due to lack of recording space in the recording medium, and the controlling unit deletes from the recording medium the end portion of the piece of video data which abnormally stopped being recorded and controls the recording unit to record the generated piece of playback control information onto the recording medium.

With the above construction, even if a recording abnormally stops due to lack of recording space, the incompletely recorded portion of video data is deleted, preventing an invalid portion of video data from remaining on the recording medium.

In the above recording apparatus, each piece of video data may include a plurality of video units, and the controlling unit deletes from the recording medium the last, incomplete video unit of the piece of video data which was abnormally stopped being recorded, as the end portion thereof.

With the above construction, an invalid video unit can be deleted from the end of the piece of video data which was abnormally stopped being recorded, enabling the coordination to be achieved.

In the above recording apparatus, each piece of playback control information may further contain an address table that includes discrete recording addresses of video data, the address table being referred to by the playback apparatus for a fastforward playback and a rewinding playback, and the recording apparatus further comprises a storing unit operable to store video unit information which shows recording addresses and sizes of video units included in a piece of video data that is being recorded by the recording unit, wherein the generating unit generates a piece of playback control information in accordance with the video unit information stored in the storing unit, and the controlling unit calculates a size of the piece of video data using the video unit information, the calculated size being less than the actual size of the piece of video data having been recorded by the recording unit, and deletes the end portion of the piece of video data having a size obtained by subtracting the calculated size from the actual size.

With the above construction, the end portion of the piece of video data having a size obtained by subtracting the calculated size from the actual size is deleted, enabling the coordination to be achieved.

In the above recording apparatus, the detecting unit may detect that the recording unit abnormally stopped recording of a piece of video data because a power supply to the recording apparatus had stopped during recording of video data.

With the above construction, it is judged that data has been abnormally recorded when a power supply to the recording apparatus stops during recording of video data.

In the above recording apparatus, each piece of video data may include a plurality of video units, each piece of playback control information further contains an address table that includes discrete recording addresses of video data, the address table being referred to by the playback apparatus for a fastforward playback and a rewinding playback, and the recording apparatus further comprises a storing unit operable to store video unit information into a nonvolatile memory, the video unit information showing recording addresses and sizes of video units included in a piece of video data that is being recorded by the recording unit, wherein the detecting unit detects whether a power failure occurred during recording of video data by referring to the nonvolatile memory immediately after the recording apparatus is powered on, and the generating unit generates a piece of playback control information in accordance with the video unit information stored in the nonvolatile memory when the detecting unit detects that the power failure occurred.

With the above construction, it is possible to play back the video data having been recorded up to the point when the power supply stopped.

In the above recording apparatus, each piece of video data includes a plurality of video units, and the controlling unit deletes from the recording medium the last, incomplete video unit of the piece of video data which was abnormally stopped being recorded.

In the above recording apparatus, the controlling unit may calculate a size of the piece of video data which was abnormally stopped being recorded, using the video unit information, the calculated size being less than the actual size of the piece of video data having been recorded by the recording unit, and deletes the incomplete video unit having a size obtained by subtracting the calculated size from the actual size.

With the above construction, it is possible to delete the last, incomplete video unit of the piece of video data which was abnormally stopped being recorded, enabling the coordination to be achieved.

The above object is also fulfilled by a recording apparatus comprising: a recording unit operable to record video data and playback control information corresponding to the video data onto a recording medium, the playback control information controlling playback operation of a playback apparatus; a detecting unit operable to detect that the recording unit stopped recording due to lack of recording space in the recording medium; a generating unit operable to, when the detecting unit detects that the recording unit stopped recording, generate a piece of playback control information corresponding to the piece of video data which was abnormally stopped being recorded; and a controlling unit operable to delete from the recording medium the end portion of the piece of video data which was stopped being recorded and controls the recording unit to record the generated piece of playback control information onto the recording medium.

With the above construction, even if a recording abnormally stops due to lack of recording space in the recording medium, a piece of playback control information is generated in correspondence with a piece of video data which was abnormally stopped being recorded. This eliminates a mismatch between the video data recorded on the recording medium and the playback control information. Also, since the generated playback control information specifies a playback section, a sequence of video data that could not be played back by conventional methods can be played back as much as possible.

The above object is also fulfilled by a recording apparatus comprising: a recording unit operable to record video data and playback control information corresponding to the video data onto a recording medium, the playback control information containing (a) section information indicating a playback section of a corresponding piece of video data to the playback apparatus and (b) an address table that includes discrete recording addresses of video data, the address table being referred to by the playback apparatus for a fastforward playback and a rewinding playback; a storing unit operable to store video unit information into a nonvolatile memory, the video unit information showing recording addresses and sizes of video units included in a piece of video data that is being recorded by the recording unit, wherein the detecting unit operable to detect whether the recording unit abnormally stopped recording of a piece of video data due to a stoppage of power supply to the recording apparatus; a generating unit operable to, when the detecting unit detects that the recording unit abnormally stopped recording, generate a piece of playback control information corresponding to the piece of video data which was abnormally stopped being recorded; and a controlling unit operable to control the recording unit to record the generated piece of playback control information onto the recording medium.

With the above construction, even if a recording abnormally stops due to a power failure, a piece of playback control information is generated in correspondence with a piece of video data which was abnormally stopped being recorded. This eliminates a mismatch between the video data recorded on the recording medium and the playback control information. Also, since the generated playback control information specifies a playback section, a sequence of video data that could not be played back by conventional methods can be played back as much as possible.

The above object is also fulfilled by a recording method comprising: a first recording step for recording video data and playback control information corresponding to the video data onto a recording medium, the playback control information controlling playback operation of a playback apparatus; a detecting step for detecting an abnormality which indicates that the recording step abnormally stopped recording of a piece of video data and failed to record a corresponding piece of playback control information onto the recording medium; a generating step for, when the detecting step detects the abnormality, generating the piece of playback control information corresponding to the piece of video data which was abnormally stopped being recorded; and a second recording step for recording the generated piece of playback control information onto the recording medium.

In the above recording method, each piece of playback control information may contain section information indicating a playback section of a corresponding piece of video data to the playback apparatus.

With the above construction, in the recording apparatus using the recording method, even if a recording abnormally stops, a piece of playback control information is generated in correspondence with a piece of video data which was abnormally stopped being recorded. This eliminates a mismatch between the video data recorded on the recording medium and the playback control information. Also, since the generated playback control information specifies a playback section, a sequence of video data that could not be played back by conventional methods can be played back as much as possible.

The above object is also fulfilled by a computer-readable recording medium storing a program that allows a computer in a recording apparatus to execute: a first recording step for recording video data and playback control information corresponding to the video data onto a recording medium, the playback control information controlling playback operation of a playback apparatus; a detecting step for detecting an abnormality which indicates that the recording step abnormally stopped recording of a piece of video data and failed to record a corresponding piece of playback control information onto the recording medium; a generating step for, when the detecting step detects the abnormality, generating the piece of playback control information corresponding to the piece of video data which was abnormally stopped being recorded; and a second recording step for recording the generated piece of playback control information onto the recording medium.

In the above recording medium, each piece of playback control information may contain section information indicating a playback section of a corresponding piece of video data to the playback apparatus.

With the above construction, in the recording apparatus that is executing the program obtained via a recording medium, even if a recording abnormally stops, a piece of playback control information is generated in correspondence with a piece of video data which was abnormally stopped being recorded. This eliminates a mismatch between the video data recorded on the recording medium and the playback control information. Also, since the generated playback control information specifies a playback section, a sequence of video data that could not be played back by conventional methods can be played back as much as possible.

The above object is also fulfilled by a program that allows a computer in a recording apparatus to execute: a first recording step for recording video data and playback control information corresponding to the video data onto a recording medium, the playback control information controlling playback operation of a playback apparatus; a detecting step for detecting an abnormality which indicates that the recording step abnormally stopped recording of a piece of video data and failed to record a corresponding piece of playback control information onto the recording medium; a generating step for, when the detecting step detects the abnormality, generating the piece of playback control information corresponding to the piece of video data which was abnormally stopped being recorded; and a second recording step for recording the generated piece of playback control information onto the recording medium.

In the above program, each piece of playback control information may contain section information indicating a playback section of a corresponding piece of video data to the playback apparatus.

With the above construction, in the recording apparatus that is executing the program obtained via a recording medium, a network or the like, even if a recording abnormally stops, a piece of playback control information is generated in correspondence with a piece of video data which was abnormally stopped being recorded. This eliminates a mismatch between the video data recorded on the recording medium and the playback control information. Also, since the generated playback control information specifies a playback section, a sequence of video data that could not be played back by conventional methods can be played back as much as possible.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
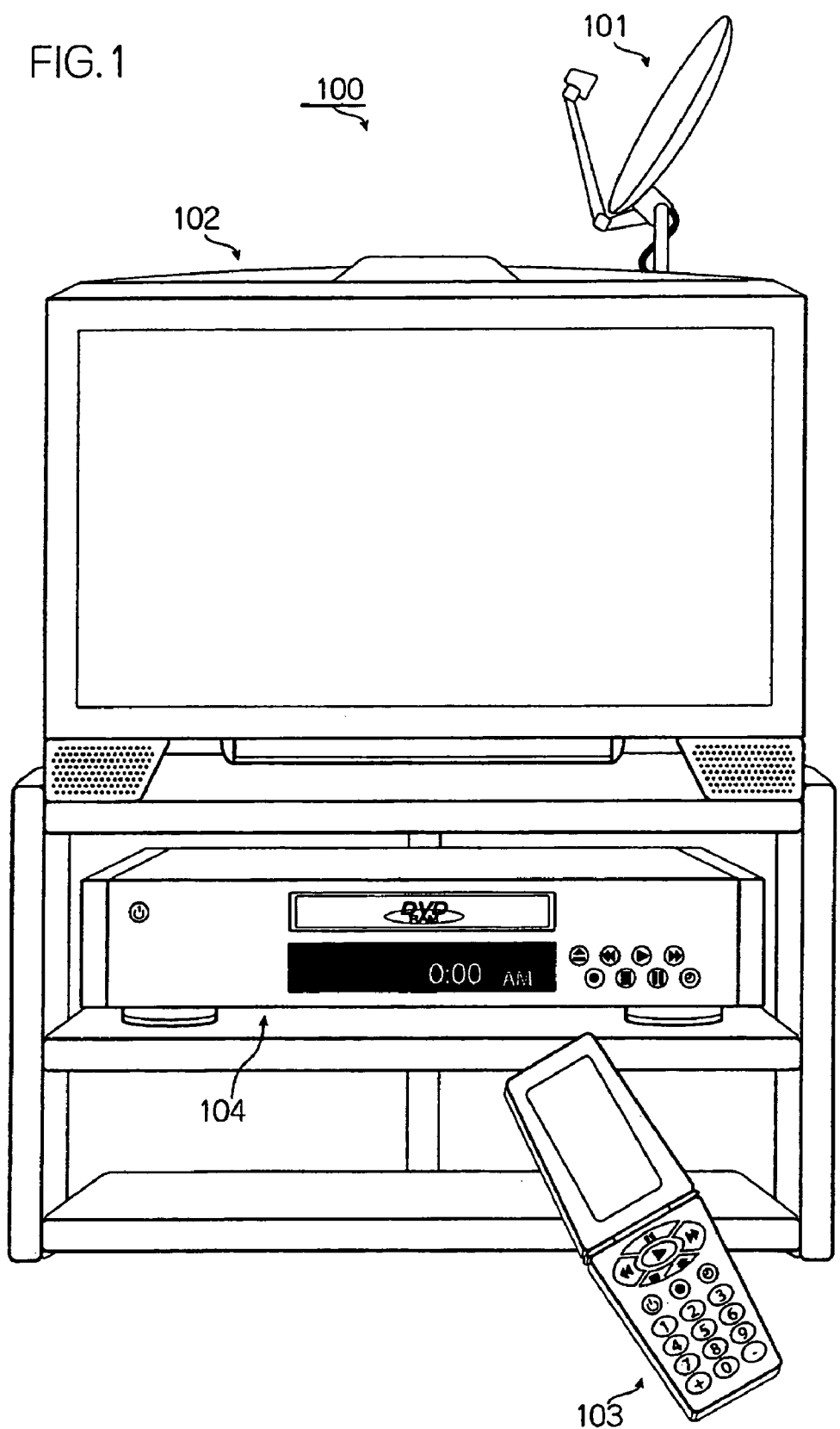
FIG. 1 is a schematic representation of an audio visual system including the digital video recording apparatus of the present invention.

The following is a description of the digital video recording apparatus of the present invention through specific embodiments thereof by way of referring to the drawings.

Embodiment 1

FIG. 1 is a schematic representation of an audio visual system including the digital video recording apparatus of the present invention.

As shown in FIG. 1, the audio visual system (hereinafter referred to as AV system) 100 is composed of an antenna 101, a monitor 102, a remote controller 103, and the digital video recording apparatus 104.

The antenna 101 receives broadcast programs (hereinafter referred to as programs) transmitted from a broadcasting station, and sends the received programs to the monitor 102 and the digital video recording apparatus 104.

It should be noted here that the programs are broadcast in analog form and that each program contains audio signals and video signals.

The monitor 102 displays the programs received by the antenna 101 and audio signals and video signals (hereinafter referred to as audio-video signals) output from the digital video recording apparatus 104.

The remote controller 103 has operation keys and a display panel, receives requests from a user via the operation keys or the like, and sends the received requests to the monitor 102 and the digital video recording apparatus 104. The remote controller 103 also provides the user, via the display panel or the like, with responses from the monitor 102 and the digital video recording apparatus 104.

The digital video recording apparatus 104 records the programs received by the antenna 101 onto a recording medium in digital form. The digital video recording apparatus 104 also outputs programs, as audio-video signals from the recording medium, to the monitor 102. Hereinafter, outputting to the monitor 102 is referred to as playing back.

The recording medium is DVD-RAM (Digital Versatile Disc Random Access Memory), HD (Hard Disk), etc.

In DVD-RAM, ZCLV (Zone Constant Linear Velocity) is used as the physical format, and UDF (Universal Disk Format) is used as the logical format.

Construction of Digital Video Recording Apparatus

Figure 2:
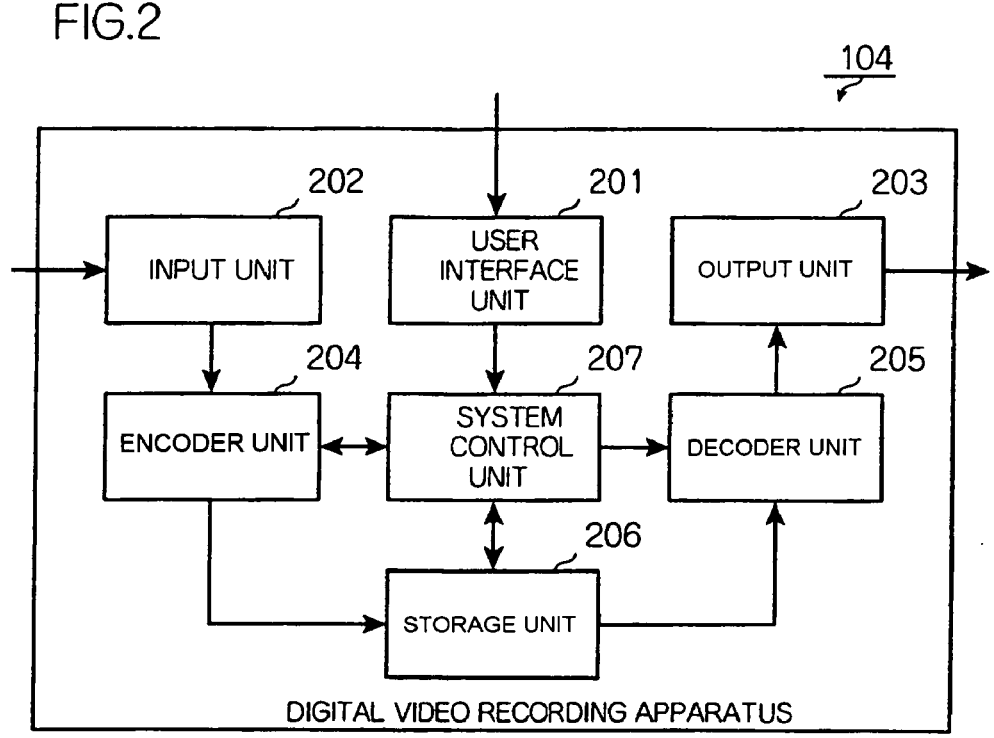
FIG. 2 is a block diagram showing functions of the digital video recording apparatus.

FIG. 2 is a block diagram showing functions of the digital video recording apparatus 104.

As shown in FIG. 2, the digital video recording apparatus 104 includes a user interface unit 201, an input unit 202, an output unit 203, an encoder unit 204, a decoder unit 205, a storage unit 206, and a system control unit 207.

The user interface unit 201 has input devices such as operation keys and output devices such as a display panel, receives from the user requests such as a recording start request and a playback start request, and sends the received requests to the system control unit 207. The user interface unit 201 also receives requests from the remote controller 103 and displays the received requests on the monitor 102.

The input unit 202 uses an A/D converter to convert audio-video signals into frame data and sends the frame data to the encoder unit 204, where the audio-video signals are input via external input terminals such as an antenna terminal, a tuner (not illustrated), and an audio-video input terminal.

The output unit 203 receives the frame data from the decoder unit 205, converts the frame data into audio-video signals using a D/A converter, and outputs the audio-video signals to the monitor 102 via external output terminals such as an audio-video output terminal.

The encoder unit 204 starts encoding after it receives an encode start instruction from the system control unit 207, and stops encoding after it receives an encode stop instruction.

It should be noted here that the encoding is a process in which the encoder unit 204 receives the frame data from the input unit 202, encodes the received frame data, and generates data in the program stream format (hereinafter referred to as video object (VOB)) as defined in MPEG (Moving Picture Experts Group).

The encoder unit 204 generates VOBUs that constitute VOBs, and each time it generates a VOBU, it sends a piece of VOBU information concerning the generated VOBU to the system control unit 207 and sends the generated VOBU to the storage unit 206. The encoder unit 204 continues to encode until it receives the encode stop instruction.

It should be noted here that a VOBU is a unit constituting a VOB, includes at least one GOP (Group of Pictures), and is composed of fixed-size (2K bytes) pack sequences. Packs containing video data are called video packs (hereinafter represented as V_PCK), and packs containing audio data are called audio packs (hereinafter represented as A_PCK). V_PCKs and A_PCKs are synchronized with each other (interleaved) in VOBUs with an error of one second or less.

Each piece of VOBU information includes a VOBU video frame playback start time (VOBU_S_PTM), a size of the first I-Picture in the VOBU (Reference_Picture_Size), a VOBU size (VOBU_Size), a playback time (PB_Time), an aspect ratio, an audio mode, and the number of audio streams.

The decoder unit 205 starts decoding after it receives a decode start instruction from the system control unit 207, and stops decoding after it receives a decode stop instruction.

It should be noted here that the decoding is a process in which the decoder unit 205 receives a VOBU from the storage unit 206 and restores the frame data from the received VOBU.

The decoder unit 205 sends the restored frame data to the output unit 203. The decoder unit 205 continues decoding until it receives a decode stop instruction.

The storage unit 206 is composed of a recording medium, a buffer, and a read/write control program. The storage unit 206 executes reading or writing of management information or a VOBU in accordance with an instruction from the system control unit 207. More particularly, when the storage unit 206 receives a VOBU write instruction from the system control unit 207, the storage unit 206 executes a VOBU writing process that will be described later. When receiving a VOBU read instruction from the system control unit 207, the storage unit 206 executes a VOBU reading process that will be described later. When receiving a playback control information write instruction, the storage unit 206 executes a playback control information writing process that will be described later. When receiving a playback control information read instruction, the storage unit 206 executes a playback control information reading process that will be described later.

It should be noted here that in the VOBU writing process, the storage unit 206 receives a VOBU from the encoder unit 204, stores the received VOBU into a buffer, writes the VOBU stored in the buffer onto the recording medium, and clears the buffer. Note that when a writing error occurs during a writing of a VOBU onto the recording medium, the storage unit 206 notifies the system control unit 207 of the writing error.

In the VOBU reading process, the storage unit 206 reads a VOBU from the recording medium, stores the read VOBU into a buffer, sends the VOBU stored in the buffer to the decoder unit 205, and clears the buffer.

In the management information writing process, the storage unit 206 receives a piece of management information from the system control unit 207, and stores the received piece of management information into the recording medium as a management information file.

In the management information reading process, the storage unit 206 reads a piece of management information from the management information file and sends the read piece of management information to the system control unit 207. Note that when the management information file is not stored in the recording medium, the storage unit 206 notifies the system control unit 207 of a reading error.

The management information contains playback control information which is calculated from the VOBU information received during recording. The management information is stored in the recording medium as a management information file after the recording ends. The management information is referred to by the system control unit 207 during a playback process. The management information controls the playback of a VOBU (VOB) stored in the recording medium.

The playback control information is used to control playback of a VOB, and includes (a) section information indicating a section in the VOB to be played back and (b) an address table which contains (i) discrete recording addresses of VOBUs that constitute the VOB and (ii) playback times corresponding to the recording addresses.

According to the VIDEO RECORDING standard, the storage unit 206 stores (a) the management information as a management information file and (b) a VOB (or a VOBU) as a stream file, in the "DVD_RTAV" directory which is immediately under the "ROOT" directory.

It should be noted here that the stream file is a generic name for the three types of files: moving-image file (VR_MOVIE.VRO), still-image file (VR_STILL.VRO), and audio file (VR_AUDIO.VRO) which is a combination of a still image picture and a dubbing sound. A piece of management information file (VR_MANGR.IFO) is created to manage the three types of AV files. In the description hereinafter, it is presumed that the stream file indicates a moving-image file, for the sake of convenience.

The system control unit 207 is composed of hardware such as a microprocessor, a RAM (Random Access Memory), a ROM (Read-Only Memory), a timer, and a nonvolatile memory and software such as a system control program stored in the ROM.

The system control unit 207 controls the encoder unit 204, decoder unit 205, storage unit 206 or the like in accordance with requests received from the user interface unit 201.

Figure 3:
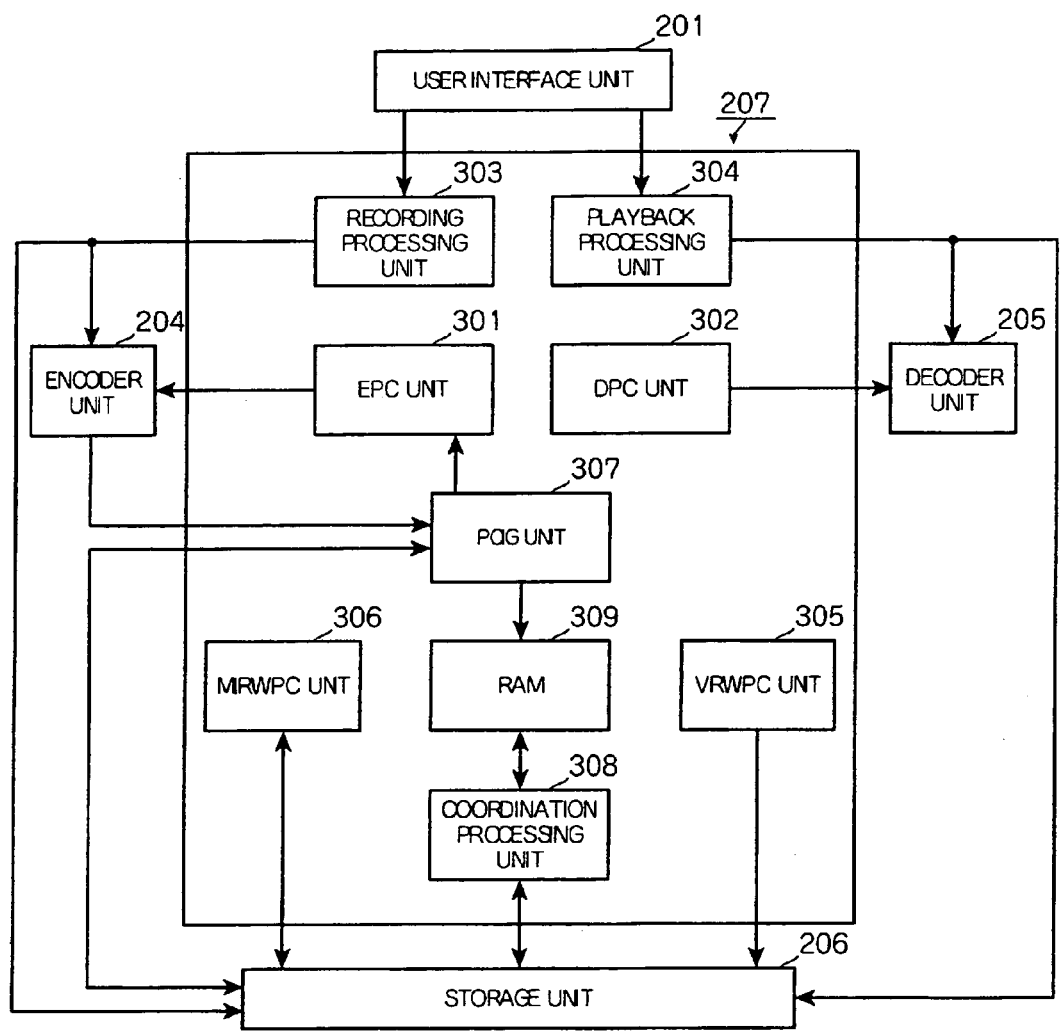
FIG. 3 is a block diagram showing the functions of the system control unit.

FIG. 3 is a block diagram showing the functions of the system control unit 207.

As shown in FIG. 3, the system control unit 207 is composed of an encode processing control unit 301, a decode processing control unit 302, a recording processing unit 303, a playback processing unit 304, a VOBU read/write processing control unit 305, a management information read/write processing control unit 306, a playback control information generating unit 307, a coordination processing unit 308, and a RAM 309.

The encode processing control unit 301 issues the encode start instruction or the encode stop instruction to the encoder unit 204 to control the encode processing.

The decode processing control unit 302 issues the decode start instruction or the decode stop instruction to the decoder unit 205 to control the decode processing.

The recording processing unit 303 executes a recording process in accordance with the recording start request received from the user interface unit 201.

It should be noted here that in the recording process, the recording processing unit 303 issues the encode start instruction to the encoder unit 204 so as to start the encode processing, and issues the VOBU write instruction to the storage unit 206 so as to execute the VOBU writing process.

The playback processing unit 304 executes a playback process in accordance with a playback start request received from the user interface unit 201.

It should be noted here that in the playback process, the playback processing unit 304 issues the VOBU read instruction to the storage unit 206 so as to execute the VOBU reading process, and issues the decode start instruction to the decoder unit 205 so as to start the decoding process.

The VOBU read/write processing control unit 306 issues either the VOBU write instruction or the VOBU read instruction to the storage unit 206 to control the VOBU writing or reading process.

The management information read/write processing control unit 306 issues either the management information write instruction or the management information read instruction to the storage unit 206 to control the management information writing or reading process.

The playback control information generating unit 307, each time the encoder unit 204 generates a VOBU that constitutes a VOB, receives a piece of VOBU information from the encoder unit 204, and according to the received piece of VOBU information, generates playback control information, adds the generated playback control information to management information which will be described later, and updates the management information. More particularly, the playback control information generating unit 307 instructs the encoder unit 204 to issue the encode start instruction, and issues the management information read instruction to the storage unit 206. The playback control information generating unit 307 then receives the management information from the storage unit 206, stores the received management information into the RAM 309, and each time it receives a piece of VOBU information from the encoder unit 204, generates the playback control information according to the received piece of VOBU information, adds the generated playback control information to the management information stored in the RAM 309, and updates the management information. The playback control information generating unit 307 then instructs the encode control processing unit 301 to issue the encode stop instruction to the encoder unit 204, receives the last piece of VOBU information from the encoder unit 204, generates the playback control information according to the last piece of VOBU information, adds the generated playback control information to the management information stored in the RAM 309, updates the management information, and stores the updated management information into the recording medium as a management information file.

The coordination processing unit 308, upon receipt of a writing error notification from the storage unit 206 while executing the recording process, stops the recording process, generates the playback control information to be stored in the recording medium from an incomplete piece of playback control information stored in the RAM 309, adds the generated playback control information to the management information, and updates the management information. The coordination processing unit 308 then executes the coordination process, and ends the recording process.

It should be noted here that in the coordination process, the coordination processing unit 308 checks whether a VOB (or a VOBU) stored in the recording medium coordinates with a VOB (or a VOBU) managed by the management information, and when they do not coordinate, allows them to coordinate with each other.

The RAM 309 stores the management information.

Management Information

Now, the management information stored in the RAM 309 will be described.

Figure 4:
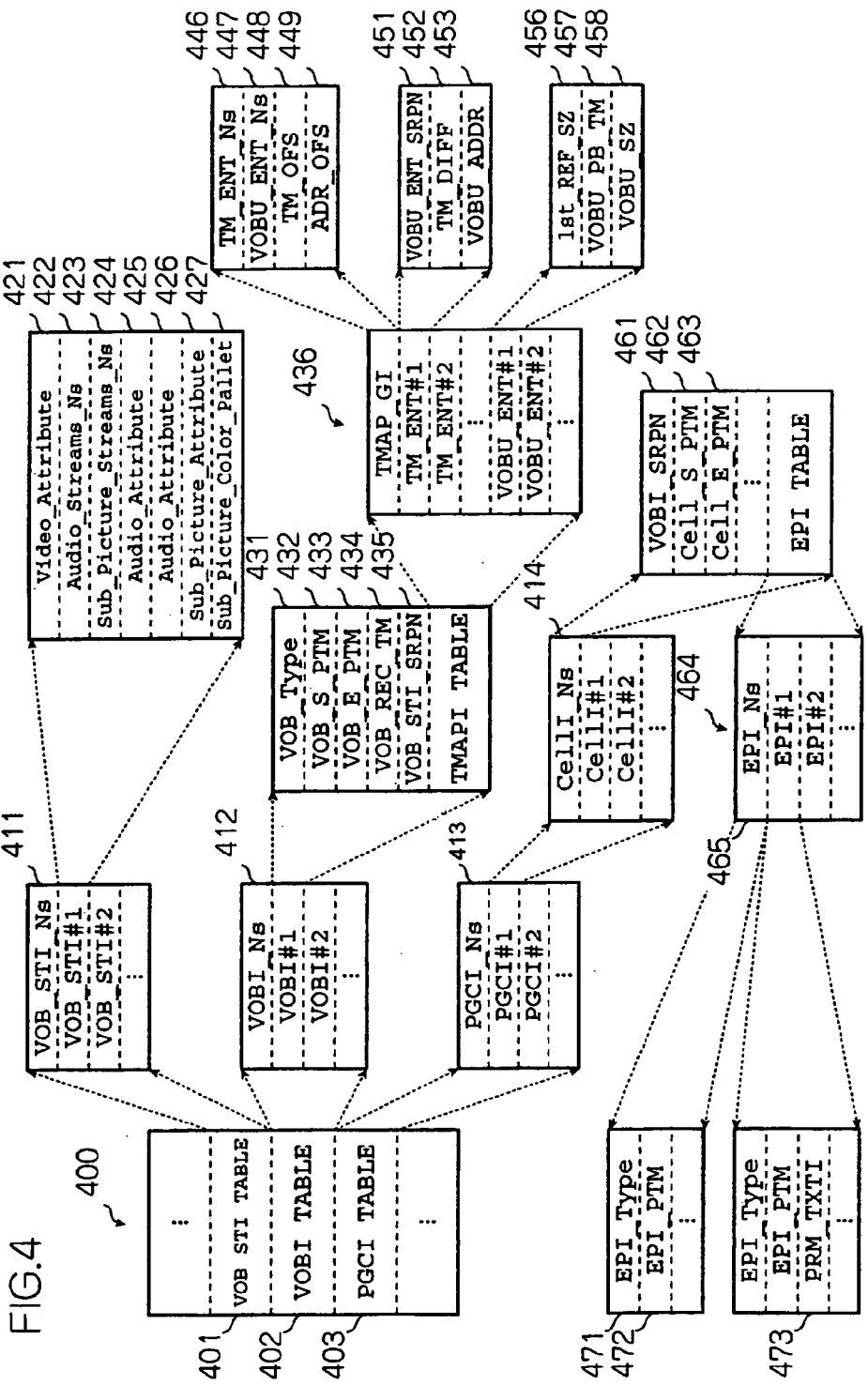
FIG. 4 shows the data structure of the management information.

FIG. 4 shows the data structure of the management information.

As shown in FIG. 4, the management information 400 includes a VOB stream attribute information table 401, a VOB information table 402, and a PGC information table 403.

VOB Stream Attribute Information Table

The VOB stream attribute information table 401 is composed of (a) a field 411 storing the number (represented as VOB_STI_Ns) of pieces of VOB stream attribute information (hereinafter referred to as VOB_STIs) and (b) as many VOB_STIs as indicated in the field 411.

Each VOB_STI is composed of fields 421 to 427.

The field 421 stores video attribute information (Video_Attribute).

The field 422 stores the number of audio streams (Audio_Streams_Ns).

The field 423 stores the number of sub-picture streams (Sub_Picture_Streams_Ns).

The fields 424 and 425 store audio attribute information (Audio_Attribute).

The field 426 stores sub-picture attribute information (Sub_Picture_Attribute).

The field 427 stores a sub-picture color palette (Sub_Picture_Color_Pallete).

VOB Information Table

The VOB information table 402 is composed of (a) a field 412 storing the number (represented as VOBI_Ns) of pieces of VOB information (hereinafter referred to as VOBIs) and (b) as many VOBIs as indicated in the field 412.

Each VOBI is composed of fields 431 to 435 and a time map information table 436.

The field 431 stores a type of a VOB (VOB_Type).

The field 432 stores a VOB playback start time (VOB_S_PTM).

The field 433 stores a VOB playback end time (VOB_E_PTM).

The field 434 stores the time when the start of a VOB is recorded (VOB_REC_TM).

The field 435 stores a search pointer to a VOB_STI (VOB_STI_SRPN).

The time map information table 436 is composed of (a) time map general information (hereinafter referred to as TMAP_GI), (b) as many time map entries (hereinafter referred to as TM_ENTs) as indicated in TMAP_GI, and (c) VOBU entries (hereinafter referred to as VOBU_ENTs).

The TMAP_GI is composed of fields 446 to 449.

The field 446 stores the number of TM_ENTs (TM_ENT_Ns).

The field 447 stores the number of VOBU_ENTs (VOBU_ENT_Ns).

The field 448 stores an offset between the starting timecode of the first VOBU and a timecode indicated by the first TM_ENT (TM_OFS).

The field 449 stores an offset between the starting address of a stream file and the starting address of a VOB (ADR_OFS).

Each TM_ENT is composed of fields 451 to 453.

The field 451 stores a search pointer to a VOBU_ENT (VOBU_ENT_SRPN).

The field 452 stores a difference between the playback start time of a VOBU ENT and the playback start time of a TM_ENT (TM_DIFF).

The field 453 stores a relative address between the starting address of a VOB and the starting address of a VOBU (VOBU_ADDR).

Each VOBU_ENT is composed of fields 456 to 458.

The field 456 stores the size of the first I-Picture in a VOBU (1st_REF_SZ).

The field 457 stores a playback time of a VOBU (VOBU_PB_TM).

The field 458 stores the size of a VOBU (VOBU_SZ).

PGC Information Table

The PGC information table 403 is composed of (a) a field 413 storing the number (represented as PGCI_Ns) of pieces of program chain information (hereinafter referred to as PGCIs) and (b) as many PGCIs as indicated in the field 413.

Each PGCI is composed of (a) a field 414 storing the number (represented as CellI_Ns) of pieces of cell information (hereinafter referred to as CellIs) and (b) as many CellIs as indicated in the field 414.

Each CellI includes fields 461 to 463 and an entry point information table 464.

The field 461 stores a pointer to information of a VOB corresponding to a cell (VOBI_SRPN).

The field 462 stores a cell playback start time (Cell_S_PTM).

The field 463 stores a cell playback end time (Cell_E_PTM).

The entry point information table 464 (a) a field 465 storing the number of pieces of entry point information (hereinafter referred to as EPIs) and (b) as many EPIs as indicated in the field 465.

Each EPI includes fields 471 and 472.

The field 471 stores the type of an entry point (EPI_Type).

The field 472 stores a time specified by the user or the system control unit 207 (EPI_PTM).

Some types of EPIs, which are indicated by the field 471, may further include a field 473 that stores text data.

The playback control information is contained in CellIs and a time map information (TMAPI) table in the management information 400.

Figure 5:
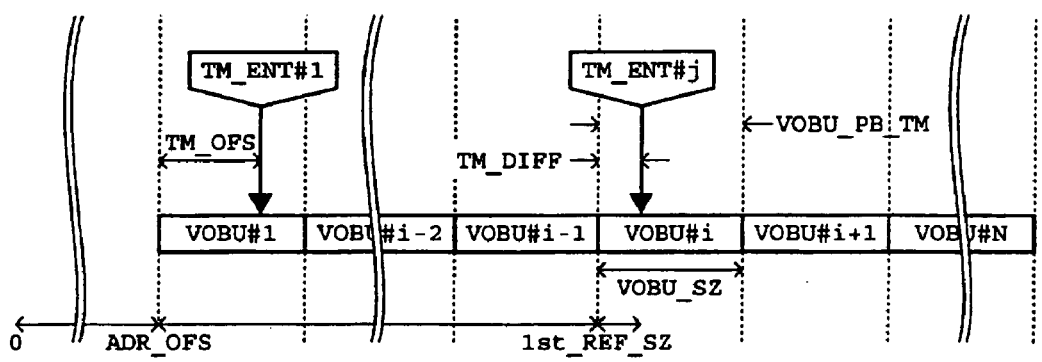
FIG. 5 shows an example of relationships between the TMAP_ENTs and VOBU_ENTs in the TMAP_GI.

FIG. 5 shows an example of relationships between the TMAP_ENTs and VOBU_ENTs in the TMAP_GI.

In the example shown in FIG. 5, VOBU_ENT #i corresponds to TM_ENT #j.

It is presumed in this example that the starting address of the stream file is "0" and that the offset between the starting address of the stream file and the starting address of VOBU #1 is indicated by ADR_OFS in TMAP_GI.

Also, the offset between the starting timecode of VOBU #1 and a timecode indicated by TMAP_ENT #1 is indicated by TM_OFS in TMAP_GI.

The size and playback time of VOBU #i and the size of the first I-Picture are indicated by VOBU_SZ, VOBU_PB_TM, and 1st_REF_SZ in VOBU_ENT #i, respectively.

The difference between the playback start time of VOBU #i and the playback start time indicated by TM_ENT #j is indicated by TM_DIFF in TM_ENT #j.

Operation of Digital Video Recording Apparatus

The operation of the digital video recording apparatus 104 with the above-described construction will be explained.

For the explanation of the operation, the coordination process 600 executed by the system control unit 207 will be provided as an example. In this example, it is presumed that the system control unit 207 receives a writing error notification from the storage unit 206 due to a lack of recording space in the recording medium during a recording.

Flowchart of Coordination Process

Figure 6:
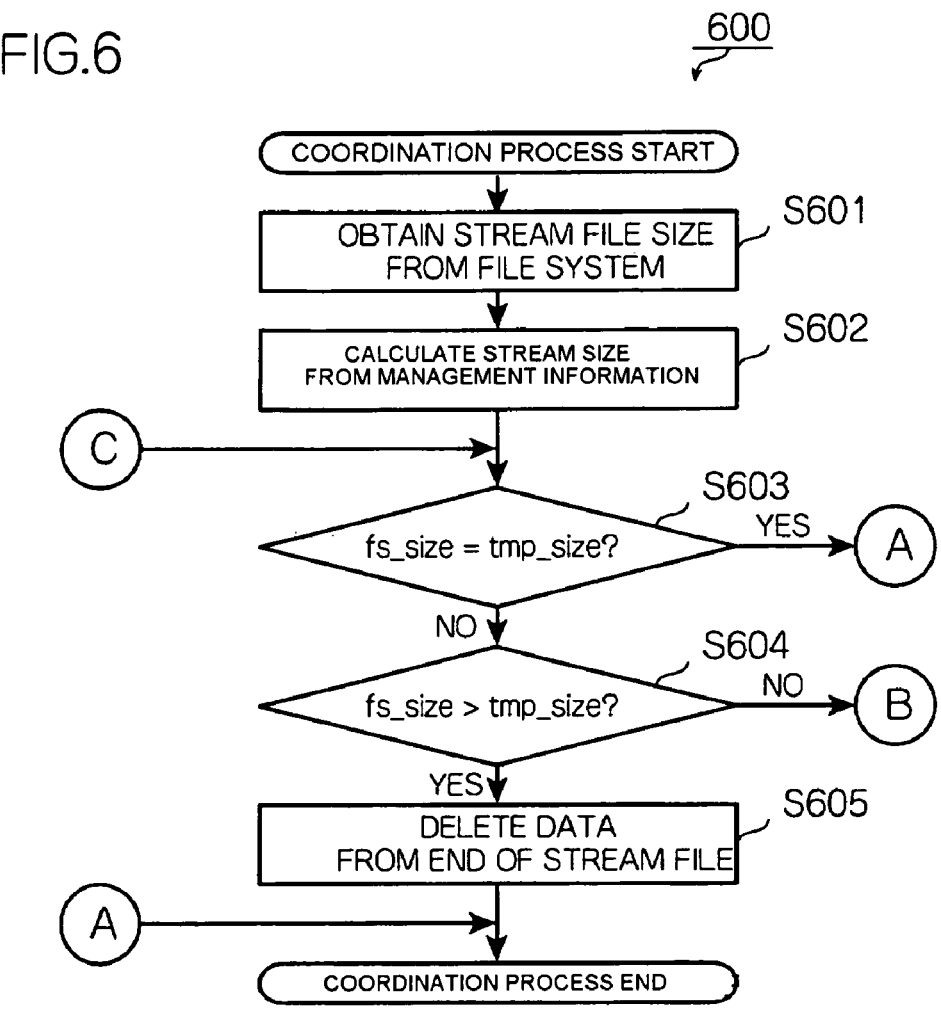
FIG. 6 shows the first part of a flowchart of the coordination process.
Figure 7:
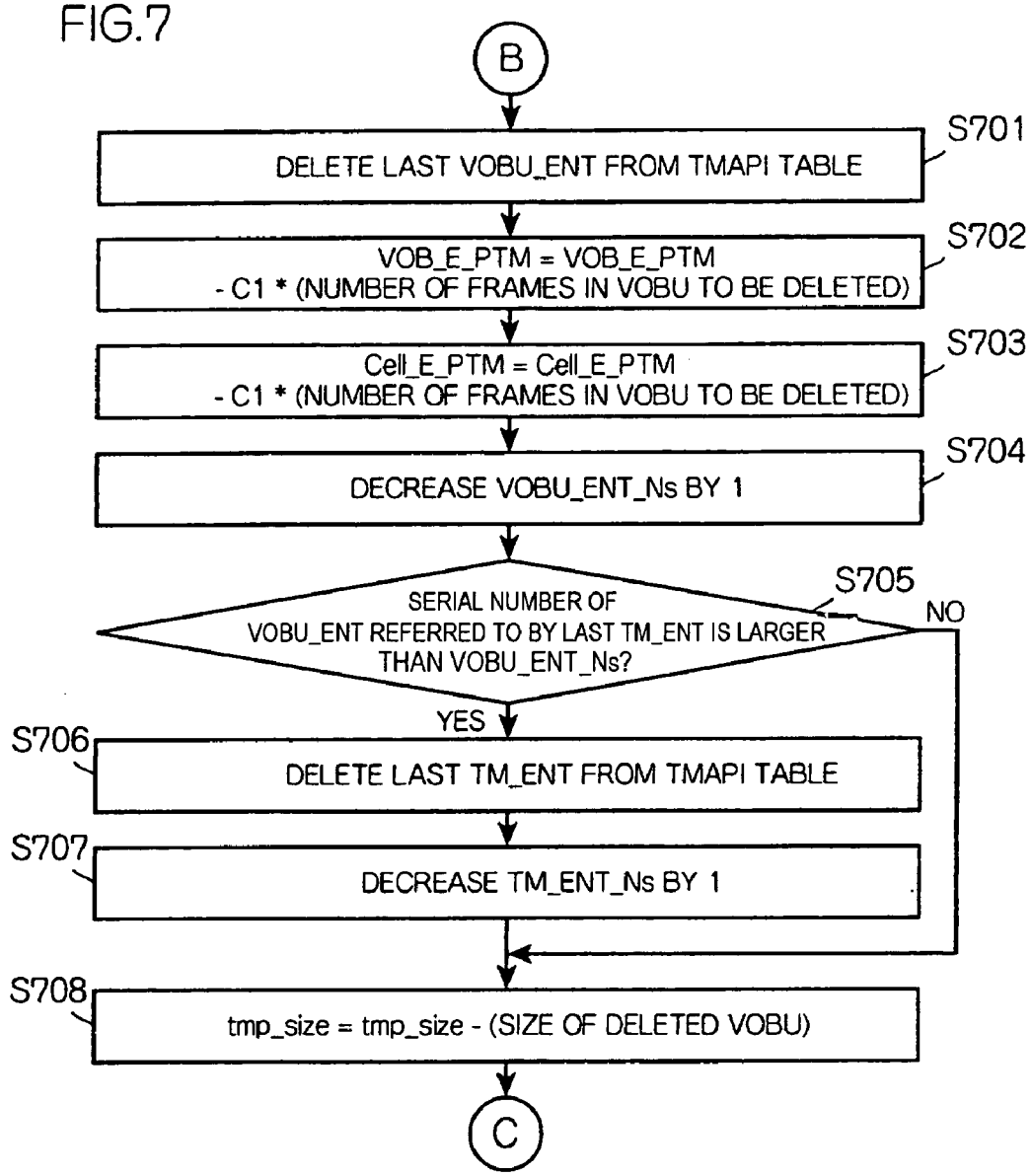
FIG. 7 shows the second part of the flowchart of the coordination process.

FIGS. 6–7 show flowcharts of the coordination process 600.

As shown in FIG. 6, the coordination processing unit 308 obtains the size of the stream file (hereinafter referred to as fs_size) via the file system (step S601). The coordination processing unit 308 then calculates the size of the stream file (hereinafter referred to as tmp_size) from the TMAPI table in the management information (step S602).

It should be noted here that the file system is a system that manages the hierarchy structure and size of files and accesses the files in accordance with UDF.

The coordination processing unit 308 judges whether the fs_size coordinates with (i.e., matches) the tmp_size (step S603).

When it is judged positively, the coordination process 600 ends, regarding that the fs_size coordinates with the tmp_size.

When it is judged negatively in step S603, it is judged whether the fs_size is larger than the tmp_size (fs_size>tmp_size) in step S604.

When it is judged positively, data having the size of the difference between the fs_size and the tmp_size is deleted from the end of the stream file (step S605). That is to say, a VOBU that is not managed by the management information is deleted from the stream file. The coordination process 600 ends with this step.

As shown in FIG. 7, when it is judged negatively in step S604, it is judged whether the fs_size is larger than the tmp_size (fs_size>tmp_size) in step S604.

When it is judged positively (i.e., the fs_size is smaller than the tmp_size), the last VOBU_ENT is deleted from the TMAPI table in the management information (step S701). The coordination processing unit 308 then updates VOB_E_PTM of the VOBI in accordance with Expression F1 (shown below) (step S702), updates Cell_E_PTM of the CellI in accordance with Expression F2 (shown below) (step S703), and decreases VOBU_ENT_Ns in TMAP_GI by "1" (step S704).

VOB_E_PTM=VOB_E_PTM−C1*(the number of frames in a VOBU to be deleted)   Expression F1

Cell_E_PTM=Cell_E_PTM−C1*(the number of frames in a VOBU to be deleted)   Expression F2

In the above expressions, the coefficient C1 is either of the following fixed values depending on whether the NTSC (National Television System Committee) or the PAL (Phase Alternation Line) format is adopted.

C1=3003—NTSC format
C1=3600—PAL format

Here, deletion of VOBU_ENT is repeated in accordance with the relationships between VOBU_ENT and TM_ENT shown in FIG. 5, it may happen that a TM_ENT does not have a VOBU_ENT to refer to. To prevent this, each time a VOBU_ENT is deleted, it is judged whether the serial number (e.g., #N) of VOBU_ENT referred to by the last TM_ENT is larger than VOBU_ENT_Ns (step S705).

When it is judged positively, it is regarded that there is no VOBU_ENT to be referred to, and the last TM_ENT is deleted from the TMAPI table of VOBI (step S706). Then, TM_ENT_Ns of TMAP_GI is decreased by "1" (step S707). The tmp_size is updated in accordance with the following Expression F3 (step S708).

tmp_size=tmp_size−(size of a deleted VOBU)   Expression F3

When it is judged negatively in step S705, step S708 is executed skipping steps S706 and S707, then the control returns to step S603 and repeats the coordination process until the fs_size coordinates with the tmp_size (i.e., fs_size=tmp_size).

As described above, the coordination processing unit 308 of the present invention executes the coordination process 600 to allow the stream file to coordinate with the management information.

Embodiment 2

The following is a description of the digital video recording apparatus in Embodiment 2 which includes the same components as Embodiment 1 with the same reference numbers and such components will not be detailed here. The following description will focus on components different from those in Embodiment 1.

Figure 8:
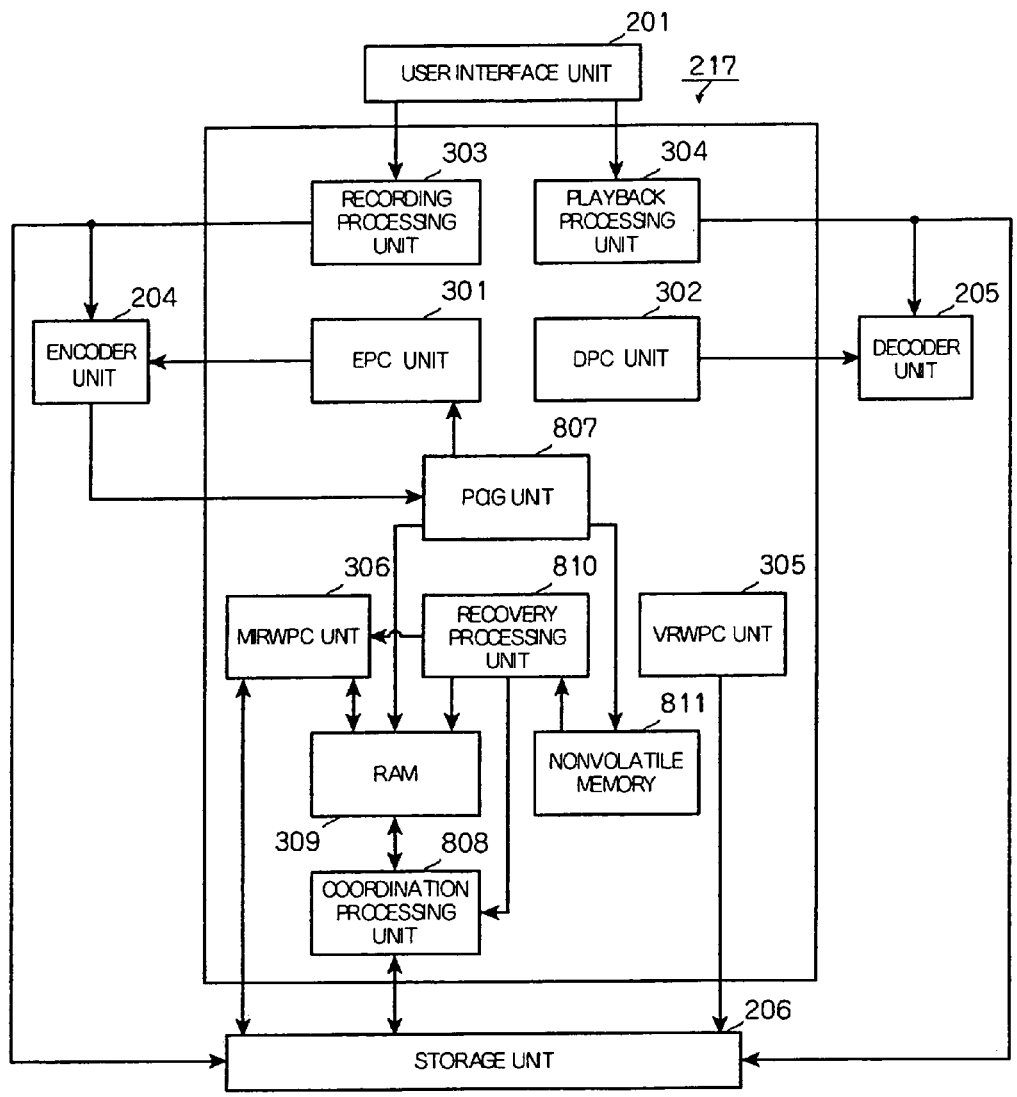
FIG. 8 is a block diagram showing functions of the system control unit in Embodiment 2.

FIG. 8 is a block diagram showing functions of the system control unit in Embodiment 2.

As shown in FIG. 8, the system control unit 217 is different from the system control unit 207 in Embodiment 1 in that it has a playback control information generating unit 807 and a coordination processing unit 808 instead of the playback control information generating unit 307 and the coordination processing unit 308, and that it further includes a recovery processing unit 810 and a nonvolatile memory 811.

The playback control information generating unit 807 is different from the playback control information generating unit 307 in that it generates saving data as a recording starts, and saves the generated saving data into the nonvolatile memory 811, that each time it receives a piece of VOBU information from the encoder unit 204, it updates the saving data stored in the nonvolatile memory 811, as well as the management information, in accordance with the received piece of VOBU information, and that it deletes the saving data from the nonvolatile memory 811 as the recording ends.

The coordination processing unit 808 differs from the coordination processing unit 308 in that it executes the coordination process 600 when receiving a coordination process request from the recovery processing unit 810, as well as when receiving a writing error notification from the storage unit 206.

The recovery processing unit 810 checks the nonvolatile memory 811 upon power-up, and when it confirms that the nonvolatile memory 811 stores the saving data, it executes a recovery process which will be described later, judging that the recording has stopped due to a power failure. After completing the recovery process, the recovery processing unit 810 issues a coordination process request to the coordination processing unit 808 so as to execute the coordination process 600 described in Embodiment 1.

In the recovery process, the recovery processing unit 810 generates the playback control information from the saving data, adds the generated playback control information to the management information, and updates the management information.

The nonvolatile memory 811 stores the saving data, and continues to store the saving data even after the power is turned off.

Saving Data

The following is a description of the saving data which is generated by the system control unit 218 in accordance with the VOBU information during a recording.

The saving data includes VOB_STI that has the same data structure as each VOB_STI (the fields 421 to 426) described with reference to FIG. 4. The VOB_STI, therefore, will not be detailed here.

Figure 9:
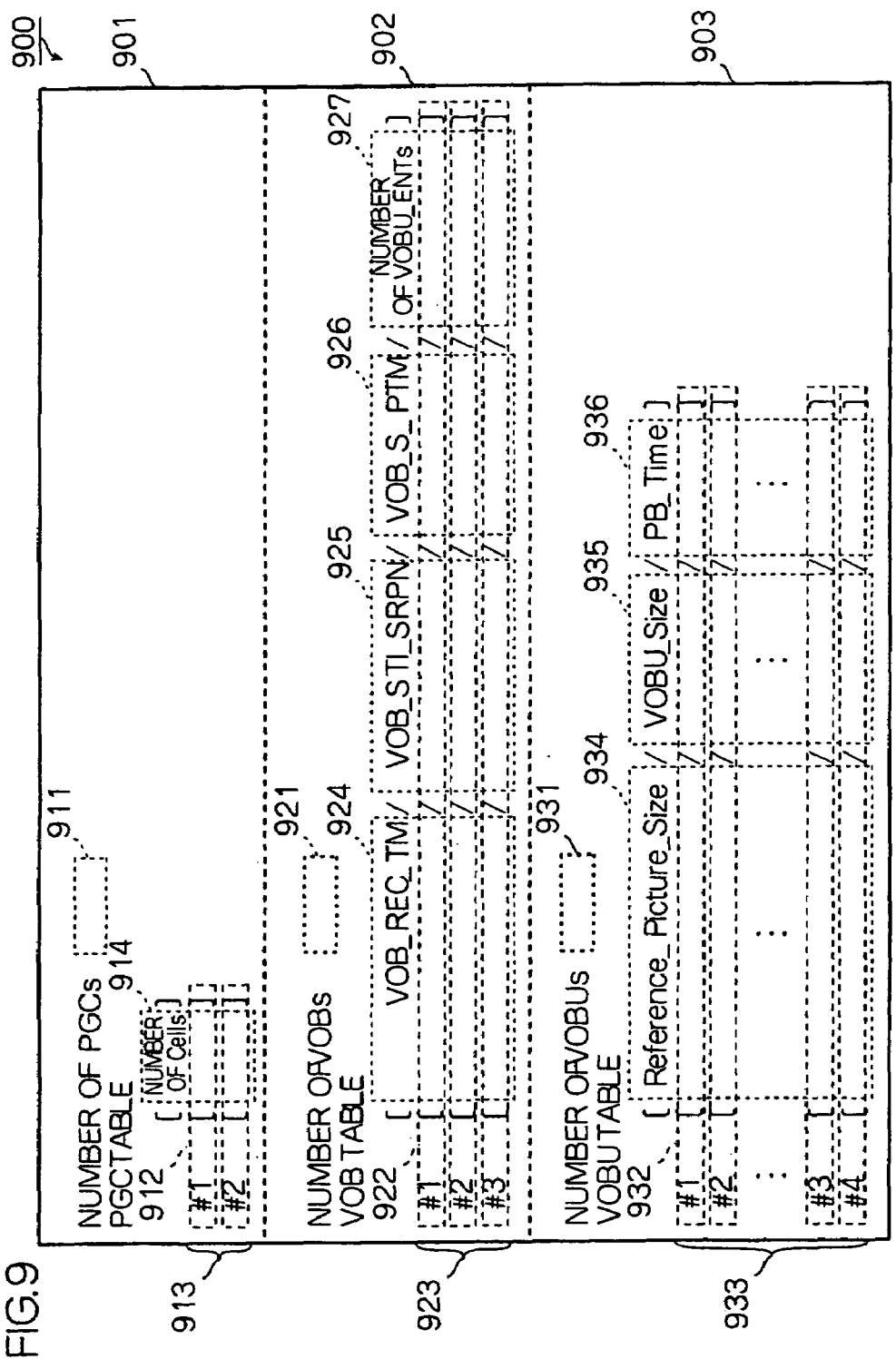
FIG. 9 shows an example of the data structure of the saving data stored in the nonvolatile memory.

FIG. 9 shows an example of the data structure of the saving data stored in the nonvolatile memory 811.

As shown in FIG. 9, the saving data 900 stored in the nonvolatile memory 811 is composed of PGC information 901, VOB information 902, and VOBU information 903.

The PGC information 901 is composed of a field 911 and a PGC table 913 including as many records 912 as indicated in the field 911.

The field 911 stores the number of PGCs (hereinafter referred to as P_Ns) which increases each time a recording is performed.

Each record 912 is composed of a field 914.

The field 914 stores the number of Cells (hereinafter referred to as C_Ns) generated in one recording.

The VOB information 902 is composed of a field 921 and a VOB table 923 including as many records 922 as indicated in the field 921.

The field 921 stores the number of VOBs (hereinafter referred to as V_Ns) which increases each time a VOB is generated or divided.

Each record 922 is composed of fields 924 to 927.

The field 924 stores the time when the start of a VOB is recorded (VOB_REC_TM).

The field 925 stores a search pointer to a VOB_STI (VOB_STI_SRPN).

The field 926 stores a VOB playback start time (VOB_S_PTM).

The field 927 stores the number of VOBU_ENTs which increases each time a piece of VOBU information is received.

The VOBU information 903 is composed of a field 931 and a VOBU table 933 including as many records 932 as indicated in the field 931.

The field 931 stores the number of VOBUs which increases each time a piece of VOB information is received.

Each record 932 is composed of fields 934 to 936.

The field 934 stores the size of the first I-Picture in a VOBU (Reference_Picture_Size).

The field 935 stores the size of a VOBU (VOBU_Size).

The field 936 stores a VOBU playback time (PB_Time).

It should be noted here that the values included in the fields 934 to 936 are contained in the VOBU information sent from the encoder unit 204.

Operation of Diaital Video Recording Apparatus

The operation of the digital video recording apparatus 104 with the above-described construction will be explained.

For the explanation of the operation, the recovery process executed by the recovery processing unit 810 of the system control unit 217 to recover from a power failure during a recording and be re-activated will be provided as an example.

Flowchart of Power Failure Check Process

Figure 10:
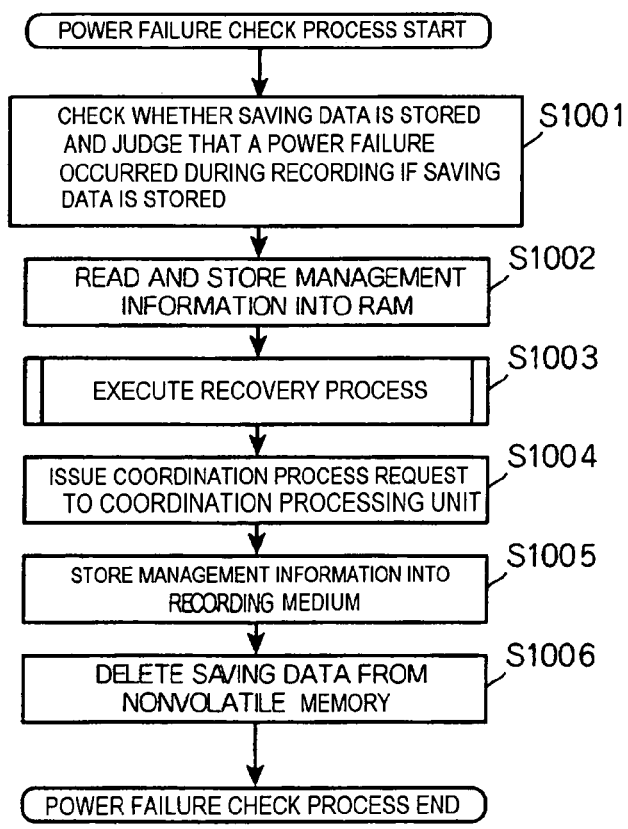
FIG. 10 shows a flowchart of a power failure check process.

FIG. 10 shows a flowchart of a power failure check process.

As shown in FIG. 10, the recovery processing unit 810 checks whether the nonvolatile memory 811 stores the saving data when the power is turned on (at re-activation) (step S1001).

When it confirms that the nonvolatile memory 811 stores the saving data, the recovery processing unit 810 judges that a power failure occurred during a recording and reads out the management information (stored as a management information file) from the recording medium, and stores the read management information into the RAM 309 (step S1002). The recovery processing unit 810 then executes the recovery process (step S1003), and issues a coordination process request to the coordination processing unit 808 so as to execute the coordination process 600 described in Embodiment 1 (step S1004). The recovery processing unit 810 then stores into the recording medium the management information stored in the RAM 309 (step S1005), and deletes the saving data from the nonvolatile memory 811 (step S1006).

Flowchart of Recovery Process

Figure 11:
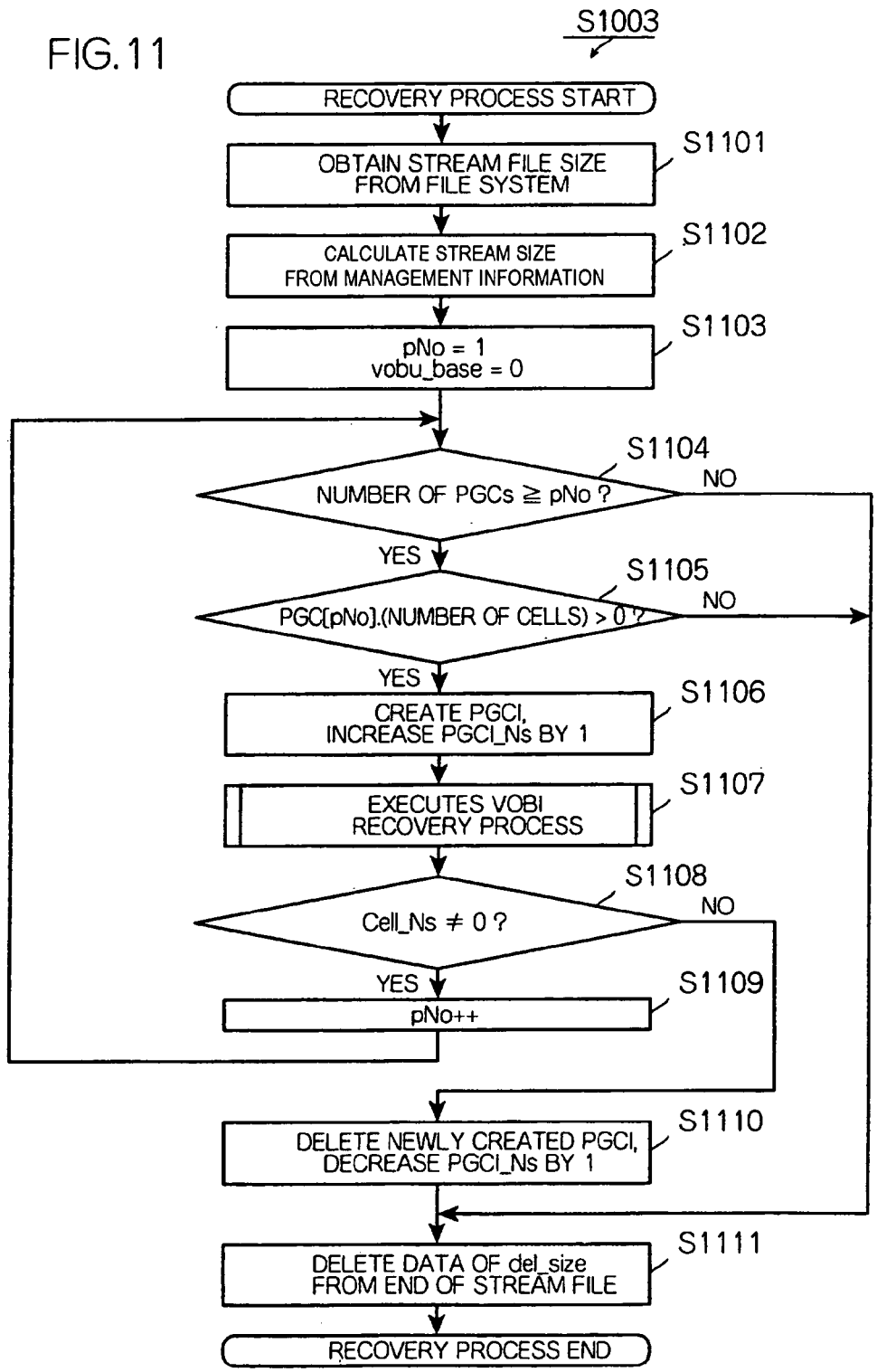
FIG. 11 is a flowchart of the recovery process.

FIG. 11 is a flowchart of the recovery process.

As shown in FIG. 11, the recovery processing unit 810 obtains the size of the stream file (hereinafter referred to as fs_stream_size) from the file system (step S1101), then calculates the size of the stream file (hereinafter referred to as ifo_stream_size) from the management information stored in the RAM 309 (step S1102).

The recovery processing unit 810 then initializes (a) a counter for counting PGCs (hereinafter referred to as pNo) to "1" and (b) vobu_base, with reference to which the VOBU table 933 contained in the saving data is searched, to "0" (step S1103).

The recovery processing unit 810 judges whether the number of PGCs included in the saving data is pNo or higher (step S1104).

When it is judged positively, the recovery processing unit 810 judges whether the number of Cells in the pNo$^{th}$ PGC is higher than "0" by referring to the PGC table 913 contained in the saving data (step S1105).

When it is judged positively in step S1105, the recovery processing unit 810 newly creates a PGCI and adds the newly created PGCI to the management information. In doing this, the recovery processing unit 810 initializes the number of CellIs included in the created PGCI to "0", and increases the number of PGCIs in the PGCI table by one (step S1106). The recovery processing unit 810 then executes a VOBI recovery process which will be described later (step S1107).

The recovery processing unit 810 then judges whether it is true that the number of Cells is not "0" (step S1108).

When it is judged positively in step S1108, the recovery processing unit 810 adds "1" to pNo (step S1109) and returns to step S1104 to repeat the steps.

When it is judged negatively in step S1108, the recovery processing unit 810 deletes the newly created PGCI, and decreases the number of PGCIs by "1" (step S1110).

The recovery processing unit 810 then calculates del_size in accordance with the following Expression K1 and deletes data having the size of del_size from the end of the stream file (step S1111).

$$\text{del\_size} = \text{fs\_stream\_size} - \text{ifo\_stream\_size} \quad \quad \text{Expression K1}$$

Step S1111 is also executed when it is judged negatively in step S1104 or S1105.

The recovery process ends with this step.

VOBI Recovery Process

Figure 12:
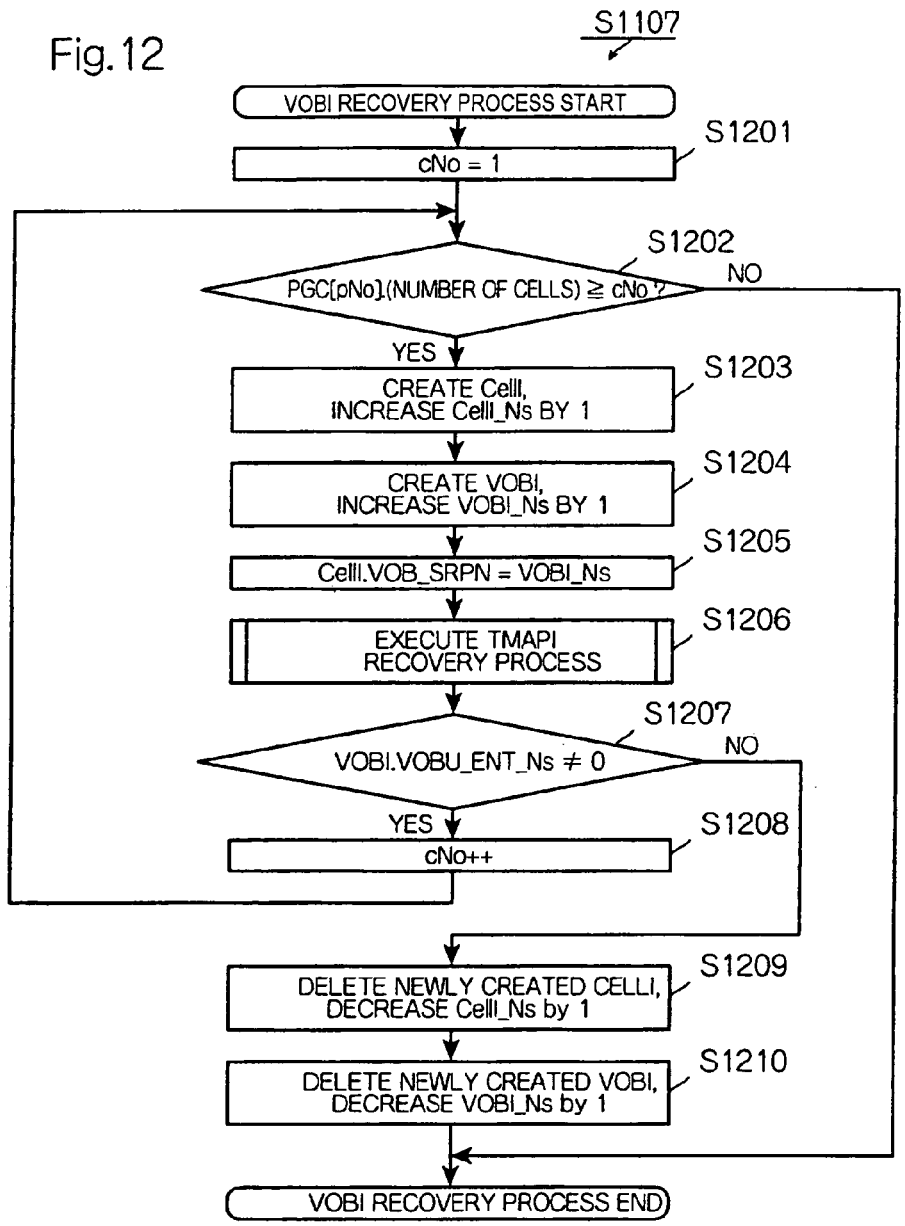
FIG. 12 is a flowchart of the VOBI recovery process.

FIG. 12 is a flowchart of the VOBI recovery process.

As shown in FIG. 12, the recovery processing unit 810 initializes a counter for counting Cells (hereinafter referred to as cNo) to "1" (step S1201).

The recovery processing unit 810 judges whether the number of Cells included in the pNo$^{th}$ PGC is no lower than cNo by referring to the PGC table 913 contained in the saving data (step S1202).

When it is judged positively in step S1202, the recovery processing unit 810 newly creates a CellI and adds the newly created CellI to the management information. In doing so, the recovery processing unit 810 increases the number of CellIs included in the PGCI by one (step S1203). The recovery processing unit 810 then creates a new VOBI based on a one-to-one relationship between CellI and VOBI, and adds the newly created VOBI to the management information. In doing so, the recovery processing unit 810 initializes TM_ENT_Ns and VOBU_ENT_Ns in TMAP_GI of the created VOBI to "0", and increases the number of VOBIs in the VOBI table by one (step S1204), then updates VOB_SRPN of the created CellI to the number of VOBIs (step S1205). The recovery processing unit 810 then executes a TMAPI recovery process which will be described later (step S1206).

The recovery processing unit 810 then judges whether it is true that VOBU_ENT_Ns is not "0" (step S1207).

When it is judged positively in step S1207, the recovery processing unit 810 adds "1" to cNo (step S1208) and returns to step S1202 to repeat the steps.

When it is judged negatively in step S1207, the recovery processing unit 810 deletes the newly created CellI, and decreases the number of CellI by "1" (step S1209). The recovery processing unit 810 deletes the newly created VOBI, and decreases the number of VOBIs by "1" (step S1210). This completes the VOBI recovery process.

The VOBI recovery process also ends when it is judged negatively in step S1202.

TMAPI Recovery Process

Figure 13:
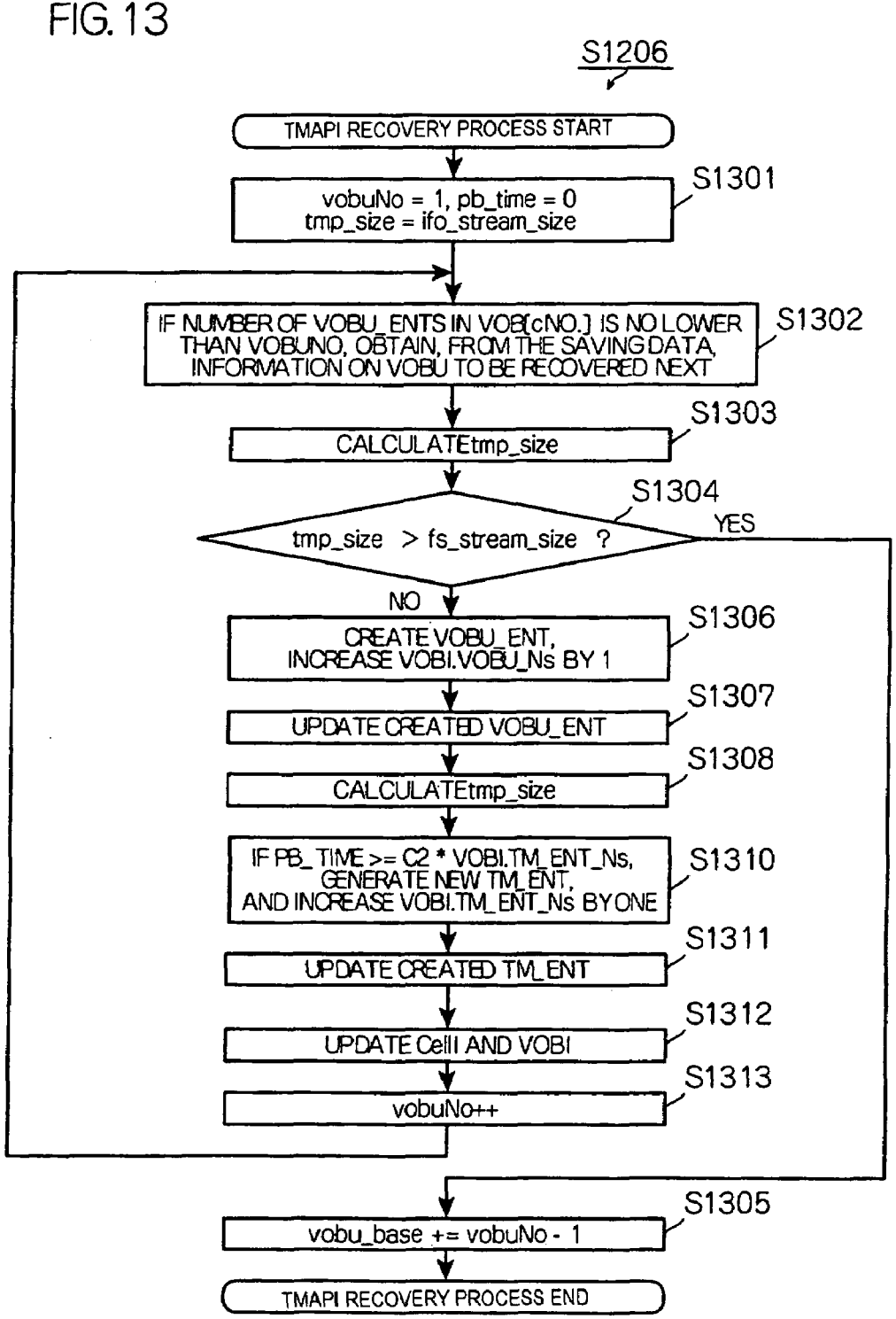
FIG. 13 is a flowchart of the TMAPI recovery process.

FIG. 13 is a flowchart of the TMAPI recovery process.

As shown in FIG. 13, the recovery processing unit 810 initializes a counter for counting VOBUs (hereinafter referred to as vobuNo) to "1", initializes a temporary variable which temporarily has a VOB playback time (hereinafter referred to as pb_time) to "0", and initializes tmp_size to ifo_stream_size (step S1301).

The recovery processing unit 810 judges whether the number of VOBU_ENTs included in the cNo$^{th}$ VOB is no lower than vobuNo by referring to the VOB table 923 contained in the saving data (step S1302).

When it is judged positively in step S1302, the recovery processing unit 810 obtains, from the saving data, information on a VOBU to be recovered next, and calculates tmp_size in accordance with Expression M1 shown below (step S1303).

tmp_size=ifo_stream_size+VOBU_Table[vobuNo].
VOBU_Size        Expression M1

In the above expression, VOBU_Table[vobuNo].VOBU_Size represents VOBU_Size in the vobuNo$^{th}$ record in the VOBU table 933.

The recovery processing unit 810 then judges whether tmp_size is larger than the fs_stream_size obtained from the file system (S1304).

When it is judged positively, the recovery processing unit 810 updates vobu_base in accordance with Expression M2 shown below (step S1305), and ends the TMAPI recovery process.

vobu_base+=vobuNo−1        Expression M2

When it is judged negatively in step S1304, the recovery processing unit 810 creates a new VOBU_ENT, and adds the newly created VOBU_ENT to the management information. In doing so, the recovery processing unit 810 increases VOBU_ENT_Ns of TMAP_GI by "1" (step S1306), and updates the created VOBU_ENT in accordance with the VOBU table 933 contained in the saving data (step S1307).

The recovery processing unit 810 then updates pb_time in accordance with Expression M3 shown below (step S1308).

pb_time+=VOBU_Table[vobuNo+vobu_base].
PB_Time        Expression M3

In the above expression, VOBU_Table[vobuNo+vobu_base].PB_Time represents PB_Time in the vobuNo$^{th}$ record in the VOBU table 933 with reference to vobu_base.

The recovery processing unit 810 judges whether Expression M4 shown below is satisfied (step S1309).

pb_time≧C2*TM_ENT_Ns        Expression M4

In the above expression, the coefficient C2 is either of the following fixed values depending on whether the NTSC or the PAL format is adopted.

C2=600—NTSC format

C2=500—PAL format

When it judges positively in step S1309, the recovery processing unit 810 generates a new TM_ENT, and adds the generated TM_ENT to the management information. In doing so, the recovery processing unit 810 increases TM_ENT_Ns of TMAP_GI by "1" (step S1310). The recovery processing unit 810 then updates the newly created TM_ENT in accordance with the following expressions Expression M5 to Expression M7 (step S1311).

TM_ENT[TM_ENT_Ns].
    VOBU_ENT_SRPN=vobuNo        Expression M5

TM_ENT[TM_ENT_Ns].TM_DIFF=C2*
    (TM_ENT_Ns−1)−(pb_time—VOBU_Table
    [vobuNo+vobu_base].PB_Time)        Expression M6

TM_ENT[TM_ENT_Ns].VOBU_ADDR=(tmp_size−
    VOBU_Table[vobuNo].VOBU_Size —(VOB
    starting address)        Expression M7

In the above expression, TM_ENT[TM_ENT_Ns].VOBU_ENT_SRPN represents the TM_ENT_Ns$^{th}$ VOBU_ENT_SRPN in TM_ENT. Similarly, TM_ENT[TM_ENT_Ns].TM_DIFF represents the TM_ENT_Ns$^{th}$ TM_DIFF, and TM_ENT[TM_ENT_Ns].VOBU_ADDR the TM_ENT_Ns$^{th}$ VOBU_ADDR.

The recovery processing unit 810 updates VOBI and CellI in accordance with Expressions M8 and M9 shown below, respectively (step S1312).

VOB_E_PTM+=C1*VOBU_Table[vobuNo+
    vobu_base].PB_Time/2        Expression M8

Cell_E_PTM+=C1*VOBU_Table[vobuNo+
    vobu_base].PB_Time/2        Expression M9

In the above expressions, since the PB_Time is represented in units of fields, a division by "2" is performed to convert from "field" to "frame". The "field" and "frame" are units used in encoding data for screens, and the MPEG2 standard defines that two "fields" can be converted into one "frame".

The recovery processing unit 810 then increases vobuNo by "1" (step S1313), and returns to step S1302 to repeat the steps.

As described above, the recovery processing unit 810 of the present invention executes the recovery process S1003 to restore the management information that can manage the VOBUs having been recorded in the recording medium up to the point when a power failure occurs.

Others

It is possible to record the system control program onto a computer-readable recording medium such as an optical recording medium (e.g., CD-ROM), a magnetic recording medium (e.g., hard disk), a magneto-optical recording medium (e.g., MO), or a semiconductor memory (e.g., ROM) and executes the system control program in a computer or another digital video recording apparatus. It is also possible to record the system control program onto a computer-readable recording medium such as a hard disk provided in a computer that is connected to a network, and allow a computer or another digital video recording apparatus to read the system control program via the network and execute it.

The RAM 309 may be supplied with electric power from a battery so that the RAM 309 can retain the management information even if a power failure occurs.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus for recording video data onto a recording medium, the recording apparatus comprising:
    a generating unit operable to generate playback control information that includes an address table showing correspondence between playback times and recording addresses for a predetermined section of the video data to be recorded;
    a recording unit operable to record the video data and the generated playback control information onto the recording medium;
    a detecting unit operable to detect an abnormality where the recording of the video data is incomplete; and
    a coordination unit operable to, if the detecting unit detects the abnormality, perform a coordination process for the playback control information that was generated on a presumption that the video data has been recorded completely onto the recording medium,
    wherein, in the coordination process, the coordination unit makes a judgment on how the predetermined section of the video data in the playback control information generated by the generating unit coordinates with a recording complete section of the video data that was recorded by the recording unit, excluding a recording incomplete section of the video data, and corrects the generated playback control information in accordance with the recording complete section of the video data.

2. The recording apparatus of claim 1,
    wherein the video data recorded on the recording medium is managed by using a file system,
    wherein the playback control information further includes size information of the predetermined section of the video data, and
    wherein the coordination unit makes the judgment by comparing a file size of the recorded video data with the size information of the predetermined section of the video data included in the playback control information.

3. The recording apparatus of claim 1,
    wherein the recording medium manages the video data recorded thereon by a file system, and
    wherein the coordination unit deletes the recording incomplete section of the video data on the file system.

4. The recording apparatus of claim 1,
    wherein the detecting unit detects, as the abnormality, a writing error of the video data onto the recording medium.

5. The recording apparatus of claim 1,
    wherein the detecting unit detects, as the abnormality, that the recording unit stopped recording of the video data due to lack of recording space in the recording medium.

6. The recording apparatus of claim 1, further comprising:
    a storing unit operable to store a part of the playback control information as saving information into a nonvolatile memory until the recording of the video data and the playback control information onto the recording medium is completed,
    wherein, in the coordination process, the coordination unit restores the playback control information generated by the generating unit from the saving information, makes a judgment on how the predetermined section of the video data in the restored playback control information coordinates with a recording complete section of the video data that was recorded by the recording unit, excluding a recording incomplete section of the video data, and corrects the generated playback control information in accordance with the recording complete section of the video data.

7. A recording apparatus for recording video data onto a recording medium, the recording apparatus comprising:
    a generating unit operable to generate playback control information that includes an address table showing correspondence between playback times and recording addresses for a predetermined section of the video data to be recorded;
    a recording unit operable to record the video data and the generated playback control information onto the recording medium;
    a storing unit operable to store a part of the playback control information as saving information into a nonvolatile memory until the recording of the video data and the playback control information onto the recording medium is completed,
    a detecting unit operable to detect an abnormality where the recording of the video data is incomplete, if the saving information has been stored in the nonvolatile memory when the recording apparatus is powered on; and
    a coordination unit operable to, if the detecting unit detects the abnormality, perform a coordination process for the playback control information that was generated on a presumption that the video data has been recorded completely onto the recording medium,
    wherein, in the coordination process, the coordination unit restores the playback control information generated by the generating unit from the saving information, makes a judgment on how the predetermined section of the video data in the restored playback control information coordinates with a recording complete section of the video data that was recorded by the recording unit, excluding a recording incomplete section of the video data, and corrects the generated playback control information in accordance with the recording complete section of the video data.

8. A recording method for recording video data onto a recording medium, the recording method comprising:
    generating playback control information that includes an address table showing correspondence between playback times and recording addresses for a predetermined section of the video data to be recorded;
    recording the video data and the generated playback control information onto the recording medium;
    detecting an abnormality where the recording of the video data is incomplete; and
    performing, if the abnormality is detected, a coordination process for the playback control information that was generated on a presumption that the video data has been recorded completely onto the recording medium,
    wherein, in the coordination process, a judgment is made on how the predetermined section of the video data in the playback control information generated by the generating unit coordinates with a recording complete section of the video data that was recorded, excluding a recording incomplete section of the video data, and the generated playback control information is corrected in accordance with the recording complete section of the video data.

9. A recording method for recording video data onto a recording medium, the recording method comprising:
generating playback control information that includes an address table showing correspondence between playback times and recording addresses for a predetermined section of the video data to be recorded;
recording the video data and the generated playback control information onto the recording medium;
storing a part of the playback control information as saving information into a nonvolatile memory until the recording of the video data and the playback control information onto the recording medium is completed,
detecting an abnormality where the recording of the video data is incomplete, if the saving information has been stored in the nonvolatile memory when the recording apparatus is powered on; and
performing, if the abnormality is detected, a coordination process for the playback control information that was generated on a presumption that the video data has been recorded completely onto the recording medium,
wherein, in the coordination process, the generated playback control information is restored from the saving information, a judgment is made on how the predetermined section of the video data in the restored playback control information coordinates with a recording complete section of the video data that was recorded, excluding a recording incomplete section of the video data, and the generated playback control information is corrected in accordance with the recording complete section of the video data.

10. A computer-readable recording medium having recorded thereon a program for causing a computer to execute a recording method, the recording method comprising:
generating playback control information that includes an address table showing correspondence between playback times and recording addresses for a predetermined section of video data to be recorded;
recording the video data and the generated playback control information onto a recording medium;
detecting an abnormality where the recording of the video data is incomplete; and
performing, if the abnormality is detected, a coordination process for the playback control information that was generated on a presumption that the video data has been recorded completely onto the recording medium,
wherein, in the coordination process, a judgment is made on how the predetermined section of the video data in the playback control information generated by the generating unit coordinates with a recording complete section of the video data that was recorded, excluding a recording incomplete section of the video data, and the generated playback control information is corrected in accordance with the recording complete section of the video data.

11. A computer-readable medium having stored thereon a program for causing a computer to execute a recording method, the recording method comprising:
generating playback control information that includes an address table showing correspondence between playback times and recording addresses for a predetermined section of video data to record;
recording the video data and the generated playback control information onto a recording medium;
storing a part of the playback control information as saving information into a nonvolatile memory until the recording of the video data and the playback control information onto the recording medium is completed,
detecting an abnormality where the recording of the video data is incomplete, if the saving information has been stored in the nonvolatile memory when the recording apparatus is powered on; and
performing, if the abnormality is detected, a coordination process for the playback control information that was generated on a presumption that the video data has been recorded completely onto the recording medium,
wherein, in the coordination process, the generated playback control information is restored from the saving information, a judgment is made on how the predetermined section of the video data in the restored playback control information coordinates with a recording complete section of the video data that was recorded, excluding a recording incomplete section of the video data, and the generated playback control information is corrected in accordance with the recording complete section of the video data.

12. A computer-readable medium having stored thereon a program for causing a computer to execute a recording method, the recording method comprising:
generating playback control information that includes an address table showing correspondence between playback times and recording addresses for a predetermined section of video data to be recorded;
recording the video data and the generated playback control information onto a recording medium;
storing a part of the playback control information as saving information into a nonvolatile memory until the recording of the video data and the playback control information onto the recording medium is completed,
detecting an abnormality where the recording of the video data is incomplete; and
performing, if the abnormality is detected, a coordination process for the playback control information that was generated on a presumption that the video data has been recorded completely onto the recording medium,
wherein, in the coordination process, the generated playback control information is restored from the saving information, a judgment is made on how the predetermined section of the video data in the restored playback control information coordinates with a recording complete section of the video data that was recorded, excluding a recording incomplete section of the video data, and the generated playback control information is corrected in accordance with the recording complete section of the video data.

* * * * *